(12) United States Patent
Kimoto

(10) Patent No.: US 11,180,039 B2
(45) Date of Patent: Nov. 23, 2021

(54) ON-TRAVEL POWER SUPPLY SYSTEM, POWER SUPPLY FACILITY, AND ELECTRIC VEHICLE

(71) Applicant: DENSO CORPORATION, Kariya (JP)

(72) Inventor: Yuu Kimoto, Kariya (JP)

(73) Assignee: DENSO CORPORATION, Kariya (JP)

( * ) Notice: Subject to any disclaimer, the term of this patent is extended or adjusted under 35 U.S.C. 154(b) by 33 days.

(21) Appl. No.: 16/893,503

(22) Filed: Jun. 5, 2020

(65) Prior Publication Data

US 2020/0398682 A1 Dec. 24, 2020

(30) Foreign Application Priority Data

Jun. 19, 2019 (JP) .............................. JP2019-113822

(51) Int. Cl.
*B60L 53/126* (2019.01)
*B60L 58/20* (2019.01)
*H02J 50/80* (2016.01)
*H02J 50/40* (2016.01)
*H02J 50/10* (2016.01)

(52) U.S. Cl.
CPC ............. *B60L 53/126* (2019.02); *B60L 58/20* (2019.02); *H02J 50/10* (2016.02); *H02J 50/40* (2016.02); *H02J 50/80* (2016.02)

(58) Field of Classification Search
CPC ..................................................... B60L 53/126

USPC .......................................................... 320/104
See application file for complete search history.

(56) References Cited

U.S. PATENT DOCUMENTS

| 11,027,626 B2* | 6/2021 | Ohman .................... B60L 53/63 |
| 11,034,250 B2* | 6/2021 | Zethraeus ................ B60M 1/30 |
| 2014/0125286 A1* | 5/2014 | Cho ........................ B60L 50/51 320/128 |
| 2019/0049996 A1 | 2/2019 | Aikin et al. |

FOREIGN PATENT DOCUMENTS

JP 6095031 B1 3/2017

* cited by examiner

*Primary Examiner* — Edward Tso
*Assistant Examiner* — Ahmed H Omar
(74) *Attorney, Agent, or Firm* — Posz Law Group, PLC

(57) ABSTRACT

An on-travel power supply system is provided to include (i) a power supply facility including a plurality of power supply apparatuses arranged along a traveling road, and (ii) an electric vehicle including a power reception apparatus configured to receive power supply from the power supply apparatuses and charge a battery while traveling on the traveling road. The electric vehicle is configured to acquire, from the power supply facility, a failed road segment in which power supply is disabled from the power supply apparatuses along the traveling road. The electric vehicle is further configured to calculate a required energy amount required for the electric vehicle to pass through the failed road segment, and secure the calculated required energy amount before the electric vehicle reaches the failed road segment.

17 Claims, 6 Drawing Sheets

ND ELECTRIC
ON-TRAVEL POWER SUPPLY SYSTEM, POWER SUPPLY FACILITY, AND ELECTRIC VEHICLE

CROSS REFERENCE TO RELATED APPLICATION

The present application claims the benefit of priority from Japanese Patent Application No. 2019-113822 filed on Jun. 19, 2019. The entire disclosure of the above application is incorporated herein by reference.

TECHNICAL FIELD

The present disclosure relates to an on-travel power supply system in which a power supply facility arranged in a traveling road is configured to supply power to an electric vehicle traveling on the traveling road.

BACKGROUND

An on-travel power supply system is a system in which power supply apparatuses are provided to be arranged along a traveling road, thereby enabling the power supply apparatuses to supply power to an electric vehicle that is traveling on the traveling road.

SUMMARY

According to an aspect of the present disclosure, an on-travel power supply system may be provided to include (i) a power supply facility including a plurality of power supply apparatuses arranged along a traveling road, and (ii) an electric vehicle including a power reception apparatus configured to receive power supply from the power supply apparatuses and charge a battery while traveling on the traveling road. The electric vehicle may be configured to acquire, from the power supply facility, a failed road segment in which power supply is disabled from the power supply apparatuses along the traveling road. The electric vehicle may be further configured to calculate a required energy amount required for the electric vehicle to pass through the failed road segment, and secure the calculated required energy amount before the electric vehicle reaches the failed road segment.

BRIEF DESCRIPTION OF DRAWINGS

The objects, features and advantages of the present disclosure will become more apparent from the following detailed description made with reference to the accompanying drawings. In the drawings.

DETAILED DESCRIPTION

Embodiments of the present disclosure will be described below with reference to the drawings.

First Embodiment

Configuration

Figure 1:
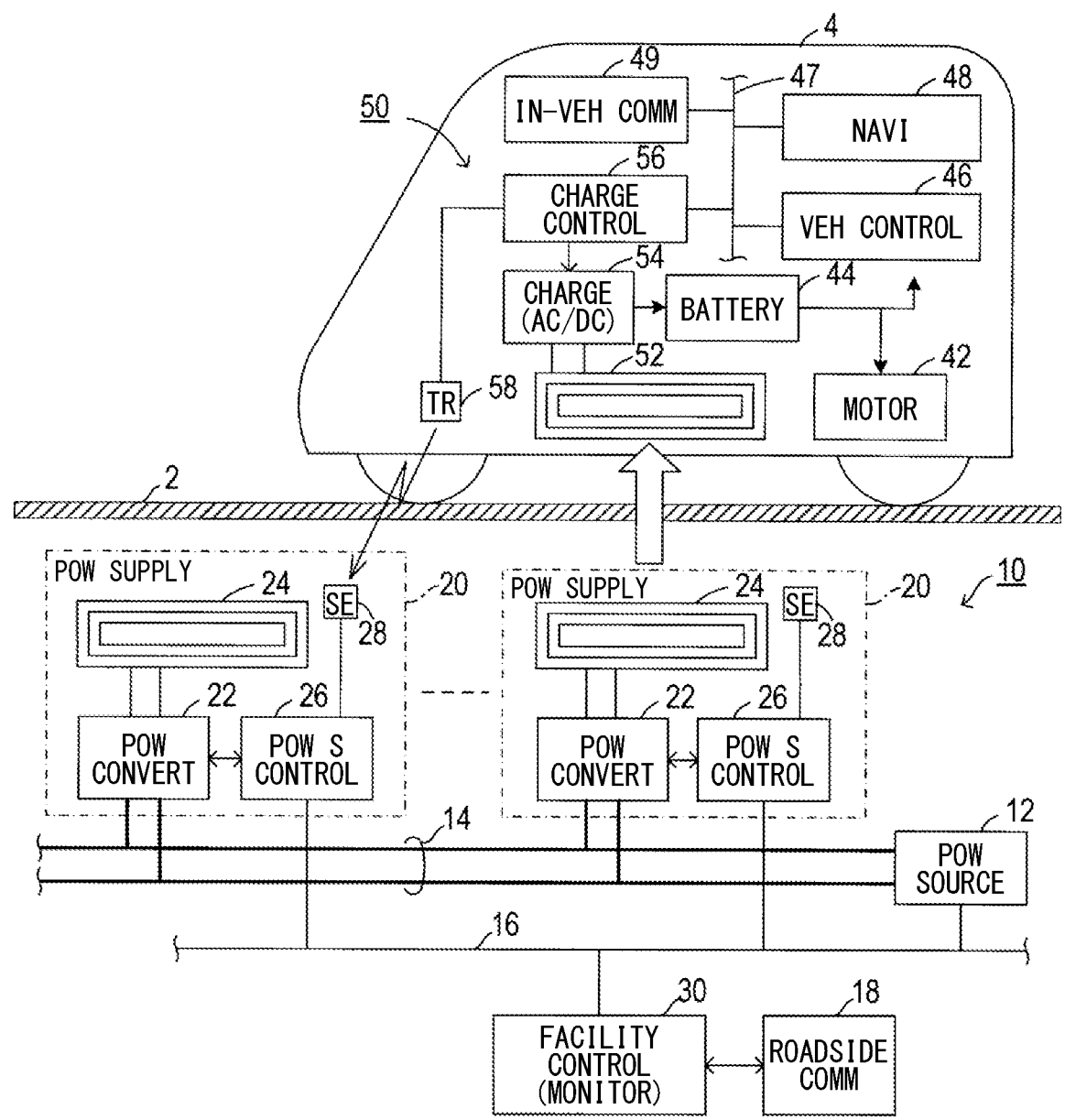
FIG. 1 is a block diagram illustrating a configuration of an on-travel power supply system according to a first embodiment.

As shown in FIG. 1, an on-travel power supply system, which may also be referred to as an on-travel charging system, according to the present embodiment includes (i) an electric vehicle 4 capable of traveling on a traveling road 2, and (ii) a power supply facility 10 including a plurality of power supply apparatuses 20 embedded in a road surface of the traveling road 2.

The plurality of power supply apparatuses 20 in the power supply facility 10 are provided for supplying power (i.e., electric power) to the electric vehicle 4 traveling on the traveling road 2 in a non-contact manner; the power supply apparatuses 20 are continuously arranged with predetermined intervals along the traveling road 2.

Each power supply apparatus 20 includes (i) a power transmission coil 24 for non-contact power supply to a power reception coil 52 provided at the bottom of the electric vehicle 4, and (ii) a power converter 22, which receives power supply via a power source line 14 wired along the traveling road 2 and which supplies AC power to the power transmission coil 24.

The power converter 22 is configured by an inverter circuit. The power converter 22 converts DC power, which is supplied by the power source 12 via the power source line 14, into AC power for power transmission, and applies the AC power to the power transmission coil 24.

As a result, when the electric vehicle 4 has reached a position above the power supply apparatus 20, energy is transmitted from the power transmission coil 24 to the power reception coil 52 by magnetic field resonance. The non-contact power supply is thus performed to the traveling electric vehicle 4.

Therefore, each of the power supply apparatuses 20 includes (i) a sensor 28 for detecting that the electric vehicle 4 as a power supply target has reached the position above the power supply apparatus 20, and (ii) a power supply controller 26 provided to output AC power from the power converter 22 to the power reception coil 52 when the electric vehicle 4 (i.e., the arrival of the electric vehicle 4) is detected by the sensor 28.

The power supply controller 26 can adjust the power supplied from the power converter 22 to the power transmission coil 24. The power supply controller 26 of each power supply apparatus 20 is connected to a communication line 16 that forms a network for the power supply facility 10. The communication line 16 is connected to a facility controller 30. The facility controller 30, which may be also referred to as a facility monitoring unit 30, monitors the operation state of each power supply apparatus 20 by communicating with each power supply apparatus 20.

The facility controller 30 is configured by a controller serving as a microcomputer (i.e., computer). Naturally, the facility controller 30 may be configured by one or more controllers or computers. Further, the facility controller 30 may be integrated into one or more other controllers achieving other functions. Yet further, the facility controller 30 providing a plurality of functions may include a plurality of units or modules providing respective functions among the plurality of functions.

As just an example of the present embodiment, such a computer is provided to include a CPU, a ROM, a RAM, and an I/O interface. In this example, a plurality of functions by the computer may be provided by a plurality of units or modules which may be achieved by the CPU executing respective programs stored in memory such as ROM or RAM. The facility controller 30 monitors the operation state of each power supply apparatus 20 and the power supply state from the power source line 14 based on a status signal transmitted from each power supply apparatus 20 via the communication line 16.

Then, the facility controller 30 reports a failed road segment to the electric vehicle 4 via a roadside communicator 18. The failed road segment is a road segment in which power cannot be supplied from the corresponding power supply apparatus(es) 20 to the electric vehicle 4. The failed road segment occurs in the traveling road 2 due to a failure of the power supply apparatus 20 itself or a disconnection of the power source line 14.

The roadside communicator 18, which may also be referred to as a roadside transceiver 18, can perform wireless communication with (i) an in-vehicle communicator 49, which also be referred to as an in-vehicle transceiver 49, mounted on the electric vehicle 4 and (ii) another management apparatus or device of the power supply facility 10, via a predetermined wireless communication line.

Next, the electric vehicle 4 is provided with a power reception apparatus 50 that includes a power reception coil 52. The power reception apparatus 50 further includes a charger 54 and a charging controller 56. The charger 54 performs AC/DC conversion of AC power generated in the power reception coil 52 by magnetic field resonance with the power transmission coil 24 into DC power, and charges the battery 44 with the converted DC power. The charging controller 56 controls charging by the charger 54.

Further, the charging controller 56 is connected with a transmitter 58, which also be referred to as a wireless transmitter 58, for wirelessly notifying each power supply apparatus 20 of the approach of the host vehicle during traveling. The charging controller 56 causes the transmitter 58 to transmit the identification information of the host vehicle. Thus, the approach of the host vehicle is reported to each power supply apparatus 20 along the traveling road 2. The "host vehicle" signifies a vehicle (i.e., the electric vehicle 4) on which the respective in-vehicle apparatuses or devices are mounted.

The transmission signal from the transmitter 58 is received by the sensor 28 provided in each power supply apparatus 20. For this reason, in each power supply apparatus 20, the power supply controller 26 identifies the electric vehicle 4 to be next supplied with power, based on the identification information received by the sensor 28. The power to be supplied to the electric vehicle 4 can thus be output from the power transmission coil 24.

The battery 44 is mounted on the electric vehicle 4 and supplies power to the motor 42 serving as a power source for the electric vehicle 4 and other in-vehicle electric apparatuses or devices mounted on the electric vehicle 4. The electric vehicle 4 includes in-vehicle electric apparatuses or devices that include (i) a vehicle controller 46 for controlling various parts of the vehicle including the motor 42 and (ii) a navigation apparatus 48, in addition to the in-vehicle communicator 49 and the charging controller 56 described above.

Further, the vehicle controller 46 and the navigation apparatus 48 are connected to a communication line 47 forming an in-vehicle LAN (Local Area Network). The in-vehicle communicator 49 and the charging controller 56 are also connected to the communication line 47.

Therefore, these can perform two-way communication via the communication line 47. The charging controller 56 can acquire various information such as a vehicle speed, a current position, and a scheduled traveling route from the vehicle controller 46 or the navigation apparatus 48 via the two-way communication. The charging controller 56 can perform wireless communication with an external communicator including the roadside communicator 18 via the in-vehicle communicator 49.

The charging controller 56 is configured by a controller serving as a microcomputer (i.e., computer). Naturally, the charging controller 56 may be configured as one or more controllers or computers. Further, the charging controller 56 may be integrated into one or more other controllers achieving other functions. Yet further, the charging controller 56 providing a plurality of functions may include a plurality of units or modules providing respective functions among the plurality of functions.

As just an example of the present embodiment, such a computer is provided to include a CPU, a ROM, a RAM, and an I/O interface. In this example, a plurality of functions by the computer may be provided by a plurality of units or modules which may be achieved by the CPU executing respective programs stored in memory such as ROM or RAM. The charging controller 56 causes the transmitter 58 to transmit the identification information of the host vehicle (i.e., the electric vehicle 4) while the electric vehicle 4 is traveling. Thus, the approach of the host vehicle is reported to the power supply apparatus 20 on the traveling road 2 side; the electric vehicle 4 can thus be supplied with electric power.

Figure 2:
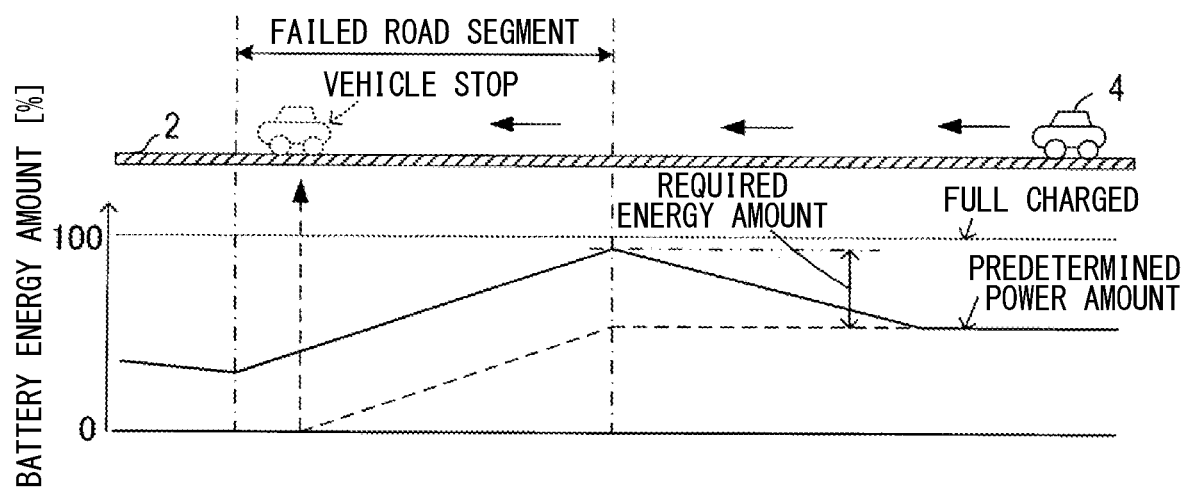
FIG. 2 is an explanatory diagram illustrating a power supply operation from a power supply facility in a traveling road to an electric vehicle that is traveling.

Further, the charging controller 56 causes the charger 54 to charge the battery 44 up to a predetermined power amount with the power supplied from the power supply apparatus 20. As shown in FIG. 2, when the battery energy at which the battery 44 is fully charged is assumed to be 100%, the predetermined power amount is set to be approximately halfway between 0% and 100%, for example, 55% to 60% of the battery energy.

This is because the battery 44 is charged not only by the power from the charger 54 but also by the power output from the motor 42 when the electric vehicle 4 is traveling on a downhill. That is, the charging controller 56 controls the battery energy amount of the battery 44 to be a predetermined power amount between 0% and 100% so that the battery 44 is properly charged and discharged.

Note that a failure of one or more power supply apparatuses 20, disconnection of the power source line 14, or the like may occur in the traveling road 2. As a result, a failed road segment in which power cannot be supplied to the electric vehicle 4 may arise in a part of the traveling road 2. In this case, the electric vehicle 4 traveling in the failed road segment cannot receive power supply from the corresponding power supply apparatus(es) 20 located in the failed road segment. Therefore, in some cases, as shown by the dotted line in FIG. 2, battery energy is consumed before the electric vehicle 4 passes through the failed road segment. The electric vehicle 4 may be disabled to run and may stop on the road.

Therefore, in the on-travel power supply system of the present embodiment, when a failed road segment occurs in the traveling road 2, as shown by a solid line in FIG. 2, the necessary energy is stored in the battery 44 in advance. That is, by the time when the electric vehicle 4 reaches the failed road segment, the energy necessary for passing through the failed road segment is stored in the battery 44.

That is, in the present embodiment, the battery 44 is charged so as to obtain a power amount before reaching the failed road segment; such a power amount enables the electric vehicle 4 to pass through the failed road segment and continue traveling on the traveling road 2 even after passing through the failed road segment.

Control Process

In order to supply power (i.e., electric power) to the electric vehicle 4 scheduled to travel in the failed road segment, a control process is executed by the facility controller 30 on the traveling road 2 side and the charging controller 56 on the electric vehicle 4 side, respectively, as described above. Such a control process will be described with reference to the flowchart shown in FIG. 3.

Figure 3:
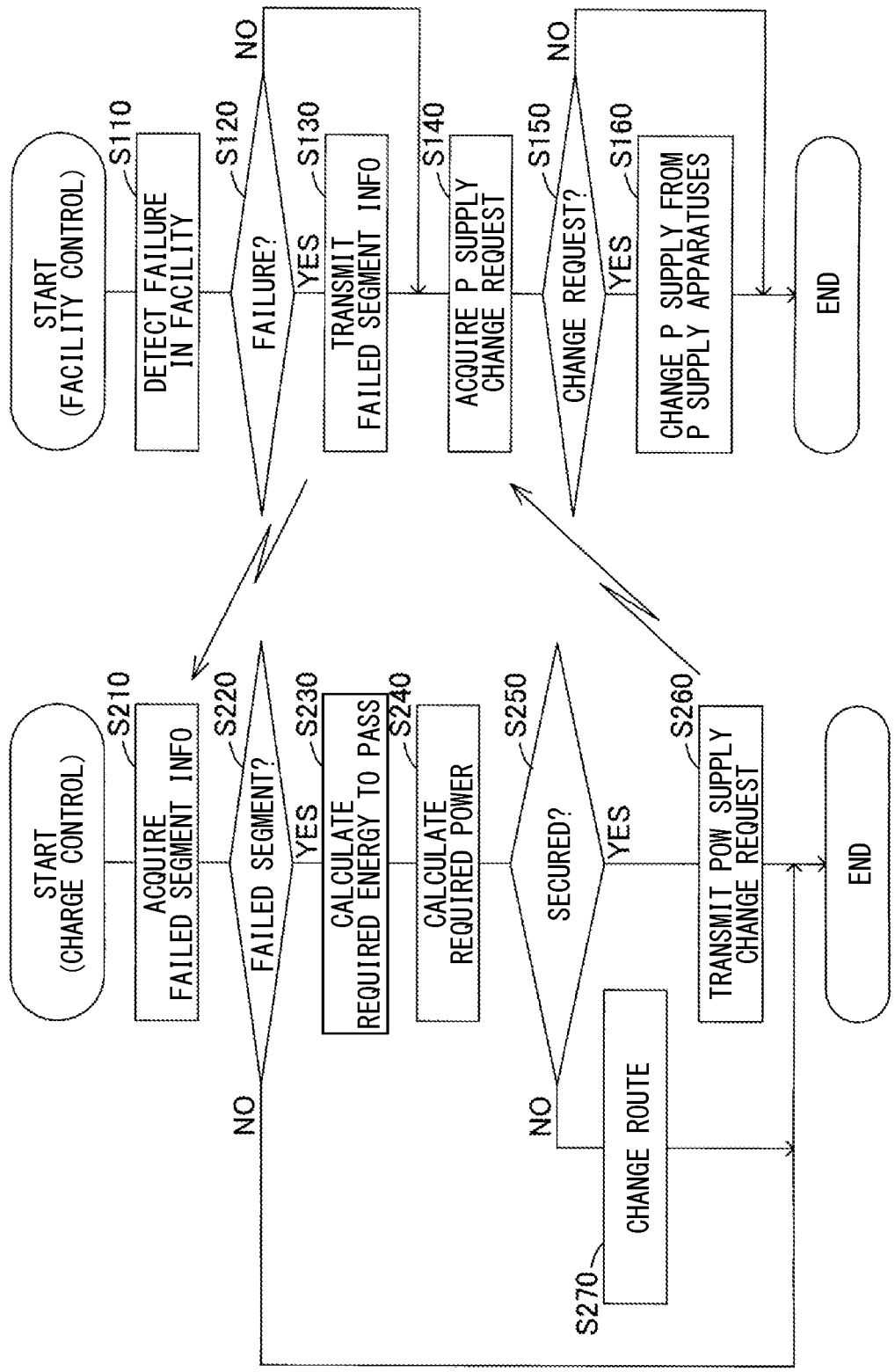
FIG. 3 is a flowchart illustrating a control process executed in a power supply facility and an electric vehicle for supplying power to the electric vehicle according to the first embodiment.

Note that, in FIG. 3, the flowchart on the left side shows a control process executed by the charging controller 56; the flowchart on the right side shows a control process executed by the facility controller 30. The respective processes are periodically executed by the charging controller 56 and the facility controller 30 as one of the main routines.

As shown in FIG. 3, in S110, the facility controller 30 performs communication with each of the power supply controller 26 of each power supply apparatus 20 and the power source 12. Thus, the operation state of the power supply facility 10 is monitored to detect a failure in the power supply facility 10; thus, the processing or function as a failed road segment detection unit is executed.

Next, in S120, it is determined whether a failure in the power supply facility 10 has been detected in S110. If a failure in the power supply facility 10 has been detected, the process proceeds to S130. If no failure in the power supply facility 10 has been detected, the process proceeds to S140.

In S130, a failed road segment in the traveling road 2 is specified from the failure detection result in S110. The electric vehicle 4 is notified via the roadside communicator 18 of the failed road segment information indicating the position and length of the specified failed road segment. The processing in S130 serves as a failed road segment notification unit. The process then proceeds to S140.

On the other hand, in the charging controller 56 in the electric vehicle 4, first, in S210, the failed road segment information transmitted from the roadside communicator 18 in the power supply facility 10 is acquired via the in-vehicle communicator 49. The processing in S210 serves as a failed road segment acquisition unit.

Then, in S220, it is determined, based on the failed road segment information acquired via the in-vehicle communicator 49, whether there is a failed road segment on the scheduled travel route of the host vehicle. If there is a failed road segment, the process proceeds to S230; if there is no failed road segment, the control process is temporarily ended.

Note that the scheduled travel route and the position of the host vehicle are acquired from the navigation apparatus 48. Then, in S220, when the host vehicle is approaching the failed road segment and is within a predetermined distance range from the failed road segment, it is determined that there is a failed road segment. When the host vehicle is far away from the failed road segment, it is determined that there is no failed road segment. After the host vehicle approaches, it is determined that there is a failed road segment.

In S230, the required energy amount required for the host vehicle to pass through the failed road segment without power supply is calculated based on the failed road segment information acquired in S210. The processing in S230 serves as a required energy calculation unit.

The required energy amount [kWh] is calculated, for example, by calculating the consumed energy [kWh] due to the traveling resistance generated during traveling in the failed road segment by following Expression (1) and multiplying it by a predetermined loss correction coefficient.

$$\text{Energy consumption due to traveling resistance [kWh]} = \Sigma(\text{air resistance coefficient} \times \text{estimated vehicle speed[km/h]}^2 + \text{mechanical resistance coefficient} \times \text{estimated vehicle speed[km/h]} + \text{rolling resistance}[N]) \times (\text{estimated vehicle speed[km/h]})/3.6)/1000 \quad (1)$$

In above Expression (1), "Σ" represents a predicted time [h] required for the host vehicle to pass through the failed road segment [km]; "×(estimated vehicle speed [km/h]/3.6)/1000" is a term for converting energy [N] to electric power [kW]. Further, the loss correction coefficient is a coefficient for correcting the consumed energy in consideration of the energy loss, and is larger than a value of 1.

Next, in S240, a required power is calculated. The required power is a charging electric power to the battery 44 required to secure the required energy amount for the host vehicle before reaching the failed road segment. The processing in S240 serves as a required power calculation unit.

The required power [kW] is calculated based on the required energy amount [kWh], the traveling distance [km] to the failed road segment, and the vehicle speed [km/h]. For example, a travel time [h] to a failed road segment is obtained from a travel distance [km] and a vehicle speed [km/h]. The required power [kW] is calculated by dividing the required energy amount [kWh] by the travel time [h]. Therefore, the required power [kW] increases as the vehicle speed [km/h] increases and the travel time [h] decreases.

Next, in subsequent S250, it is determined whether the required power calculated in S240 can be secured by the power supply from the respective power supply apparatuses 20 arranged on the traveling road 2 up to the failed road segment. In other words, it is determined whether the required energy amount can be secured before reaching the failed road segment. Note that the processing in S250 serves as a determination unit.

If it is determined in S250 that the required energy amount can be secured, the process proceeds to S260. In S260, in order to secure the required energy amount, a request is thereby transmitted for changing the power supply from the power supply apparatuses 20 to the roadside communicator 18 in the power supply facility 10. The control process then ends once.

Note that the processing in S260 serves as a required power request unit. In addition, when transmitting the request for changing the power supply in S260, required power, position information indicating the position of the host vehicle, and identification information for specifying the host vehicle are transmitted.

If it is determined in S250 that the required energy cannot be secured, the process proceeds to S270. In S270, the navigation apparatus 48 is caused to change the traveling route so that the host vehicle does not pass through the failed road segment. At the same time, the vehicle occupant is notified of the above fact. The control process is temporarily ended.

For example, in S270, when the failed road section is in an expressway, the driver is guided to change the traveling route to a general road. As a result, the driver causes the electric vehicle 4 to travel so as to bypass the failed road segment by the notification of the traveling route from the navigation apparatus 48. This can prevent the battery 44 from being discharged while the electric vehicle 4 is running in the failed road segment and the motor 42 from being disabled to be driven.

On the other hand, in the facility controller 30, in S140, the request for changing the power supply is acquired from the electric vehicle 4 scheduled to travel in the failed road segment via the roadside communicator 18. The processing in S140 serves as a required power acquisition unit.

Then, in S150, it is determined whether the request for changing has been acquired in S140. If the request for changing has not been acquired, the control process is temporarily ended. If the request for changing has been acquired, the process proceeds to S160.

In S160, one or more power supply apparatuses 20 are specified based on the position information included in the request for changing acquired in S140. Here, one or more power supply apparatuses 20 are installed in a scheduled road segment on the traveling road 2 up to the failed road segment; the electric vehicle 4 having transmitted the request for changing is going to travel on the scheduled road segment before reaching the failed road segment.

Then, the required power and the identification information included in the request for changing are transmitted to the specified power supply apparatuses 20. Thereby, the power to be supplied by the specified power supply apparatuses 20 to the electric vehicle 4 having transmitted the request for changing is changed according to the required power. The control process then ends once. Note that the processing in S160 serves as a power supply control unit.

As a result, in cases that the electric vehicle 4 is scheduled to travel in the failed road segment, the power supply from the power supply apparatuses 20 arranged on the traveling road 2 is increased more than usual in a duration up to the time when the electric vehicle 4 reaches the failed road segment. The required energy amount required for the electric vehicle 4 to pass through the failed road segment can be thereby secured.

Effects

The power supply facility 10 is supposed to fail so that some of the power supply apparatuses 20 installed on the traveling road 2 fail to supply the power to the electric vehicle 4. In such a case, the on-travel power supply system of the present embodiment can prevent the electric vehicle 4 from becoming unable to travel in the failed road segment.

Second Embodiment

Control Process: Difference from First Embodiment

In the above-described embodiment, in S250 shown in FIG. 3, the charging controller 56 determines whether the required energy amount can be secured by the power supply from the power supply apparatuses 20 arranged on the traveling road 2 up to the time when the electric vehicle 4 reaches the failed road segment.

Then, when the required energy amount can be secured, in S260, a request for changing the power supply is transmitted to the facility controller 30 in the power supply facility 10. Thus, the required power amount is secured by increasing the power supplied from each power supply apparatus 20 arranged on the traveling road 2 before the electric vehicle 4 reaches the failed road segment.

Figure 4:
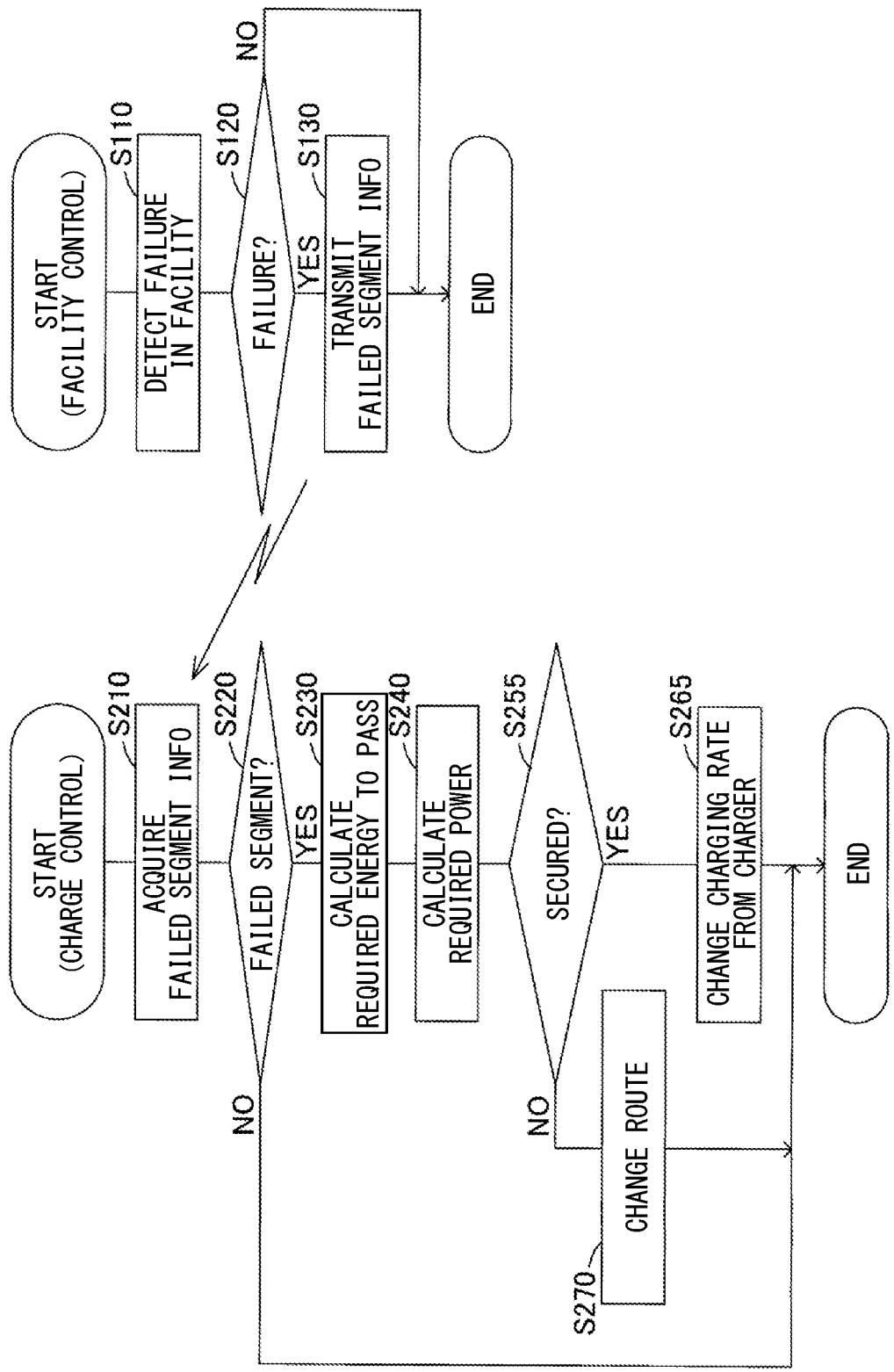
FIG. 4 is a flowchart illustrating a control process executed in a power supply facility and an electric vehicle according to a second embodiment.

On the other hand, in the present embodiment, as shown in FIG. 4, the charging controller 56 changes the charging rate by the charging current from the charger 54 to the battery 44 in S255. Thus, it is determined whether the required power (i.e., the required energy amount) can be secured.

Then, if it is determined in S255 that the required energy amount can be secured, the process proceeds to S265. In S265, the charging rate from the charger 54 to the battery 44 is changed according to the required power calculated in S240, and the control process is temporarily ended. Note that the processing in S255 serves as a determination unit; the processing in S265 serves as a charging rate control unit.

Effects

Thus, even when the charging rate from the charger 54 to the battery 44 is changed, the required energy amount can be secured in a duration before the host vehicle reaches the failed road segment. Therefore, according to the present embodiment, the same effect as the above embodiment can be obtained.

In the present embodiment, the required energy can be secured on the electric vehicle 4 side. Therefore, the power supply facility 10 does not need to change the power supplied from the power supply apparatuses 20 for the electric vehicle 4 that has transmitted the request for changing.

For this reason, each power supply apparatus 20 only needs to supply the predetermined maximum supply electric power to the electric vehicle 4. The facility controller 30 only needs to detect the failed road segment and transmit it to the electric vehicle 4 by the control process shown in FIG. 4. Therefore, according to the present embodiment, the control operation on the power supply facility 10 side can be simplified.

Third Embodiment

Configuration: Difference from First and Second Embodiments

Figure 5:
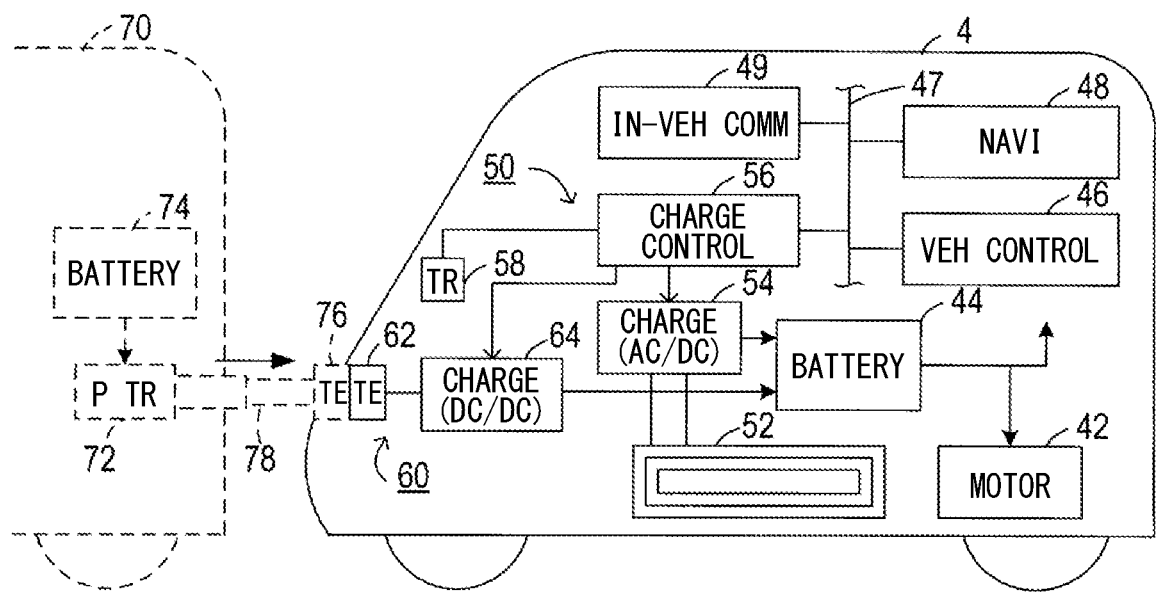
FIG. 5 is a block diagram illustrating a configuration of an electric vehicle according to a third embodiment.

As shown in FIG. 5, in addition to the power reception apparatus 50 of the above-described embodiment, the electric vehicle 4 of the present embodiment includes an inter-vehicle power reception apparatus 60 which can receive power from a different vehicle 70 (i.e., another vehicle 70) and charge the battery 44 while the electric vehicle 4 is traveling.

The inter-vehicle power reception apparatus 60 includes a power reception terminal 62, which is connected to a power supply terminal 76 projecting rearward via an arm 78 from a power transmitter 72 provided on a different vehicle 70 traveling in front of the host vehicle (i.e., the electric vehicle 4). Thus, power can be supplied from the battery 74 of the different vehicle 70.

The inter-vehicle power reception apparatus 60 includes a charger 64. When power is supplied to the power reception terminal 62 from the different vehicle 70, the charger 64 converts the supplied DC power into DC power for charging, and charges the battery 44.

A system for transmitting and receiving electric power between vehicles using the inter-vehicle power reception apparatus 60 and the power transmitter 72 is described in, for example, US 2019/0049996 A1, which is hereby incorporated by reference; thus, it is publicly known and detailed description is thus omitted here.

Control Process: Difference from First and Second Embodiments

Figure 6:
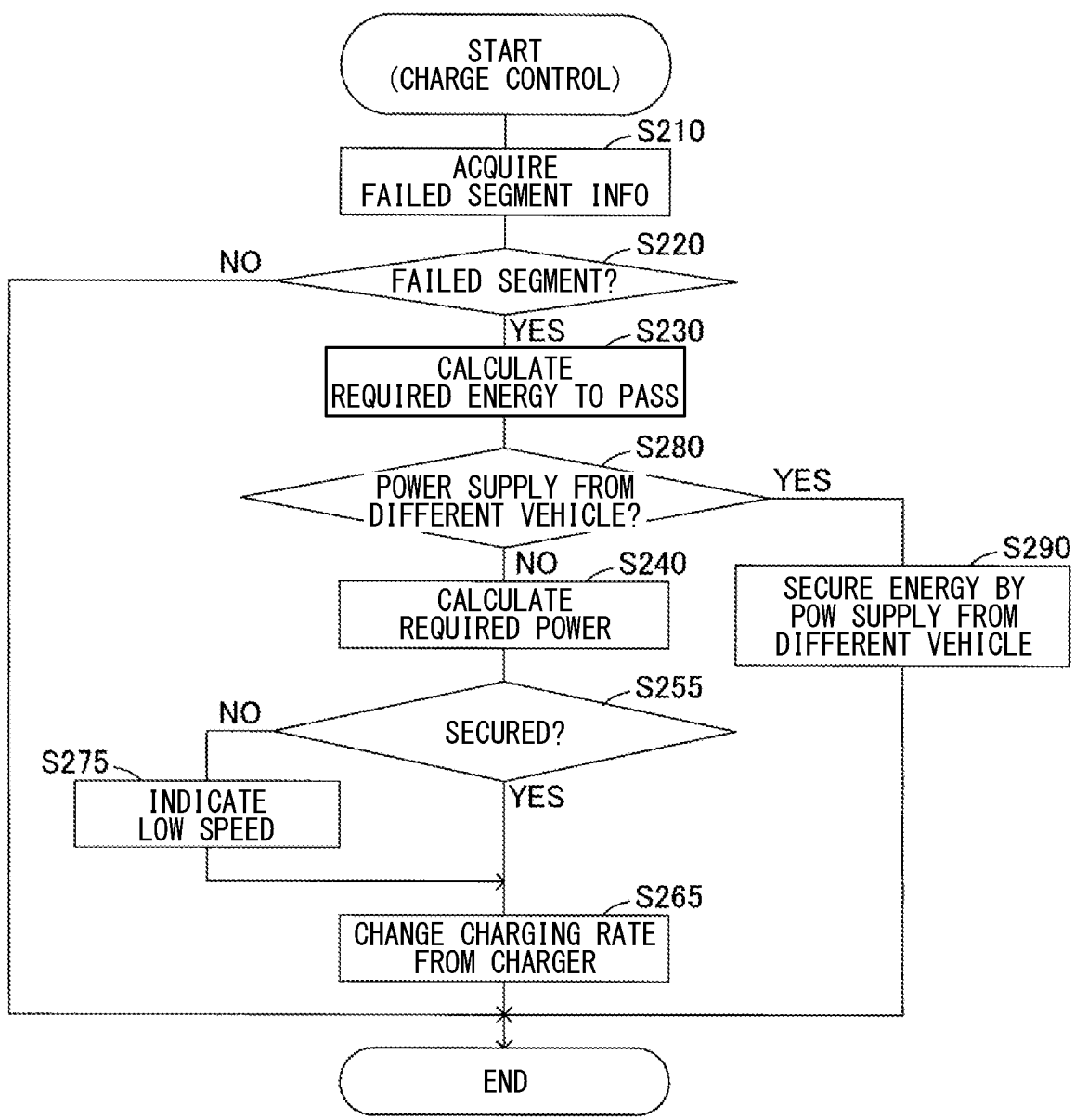
FIG. 6 is a flowchart illustrating a control process executed in an electric vehicle according to the third embodiment.

As described above, the electric vehicle 4 of the present embodiment includes the inter-vehicle power reception apparatus 60. For this reason, in the control process executed by the charging controller 56, as shown in FIG. 6, when the required energy amount is calculated in S230, the process proceeds to S280. In S280, it is determined whether there is a different vehicle 70 that can supply power around the host vehicle.

Then, when there is a different vehicle 70 that can supply power around the host vehicle, the process proceeds to S290. In S290, the processing for securing the required energy amount is performed by receiving the power supplied from the different vehicle 70 to the inter-vehicle power reception apparatus 60. The control process then ends.

In S280, the different vehicle 70 capable of supplying power to the host vehicle is searched for by wirelessly communicating with vehicles around the host vehicle via the in-vehicle communicator 49. In S290, the navigation apparatus 48 outputs a traveling command to the vehicle driver so as to travel behind the searched different vehicle 70, and guides the host vehicle. However, if the electric vehicle 4 is an automatic driving vehicle, a traveling command is output to the vehicle controller 46 to control the traveling of the host vehicle.

Then, when the host vehicle runs behind the different vehicle 70 and can perform the inter-vehicle power supply, the power supply terminal 76 of the different vehicle 70 is connected to the power reception terminal 62 of the host vehicle by wireless communication with the different vehicle 70. Then, the charger 64 charges the electric power corresponding to the required energy amount to the battery 44.

On the other hand, if it is determined in S280 that there is no different vehicle 70 capable of supplying power to the host vehicle, the process proceeds to S240. In S240, a required power is calculated. The required power is a charging electric power to the battery 44 required to secure the required energy amount for the host vehicle before reaching the failed road segment.

Then, in S255, similarly to the control process shown in FIG. 4, the charging rate is changed by the charging current from the charger 54 to the battery 44. In this way, the processing is performed as a determination unit that determines whether the required power (i.e., the required energy amount) can be secured.

If it is determined in S255 that the required energy amount can be secured, the process proceeds to S265. If it is determined that the required energy amount cannot be secured, the process proceeds to S275. In S275, the low-speed running command is output from the navigation apparatus 48 to the vehicle driver, so that the vehicle driver lowers the vehicle speed to run the host vehicle at low speed, and then proceeds to S265. However, if the electric vehicle 4 is an automated driving vehicle, the host vehicle is decelerated to run at low speed by outputting a low-speed running command to the vehicle controller 46, and the process proceeds to S265.

Then, in S265, the charging rate from the charger 54 to the battery 44 is changed so that the required energy amount can be secured before the vehicle reaches the failed road segment. The control process is temporarily ended.

Effects

As described above, the inter-vehicle power reception apparatus 60 capable of supplying power from another vehicle during traveling is mounted on the electric vehicle 4 of the present embodiment. Then, when there is a failed road segment in the scheduled traveling route of the host vehicle, the charging controller 56 charges the battery 44 by receiving power from the different vehicle 70 if power can be supplied from the different vehicle 70 via the inter-vehicle power reception apparatus 60.

For this reason, according to the present embodiment, even when the power supply apparatuses 20 on the traveling road 2 side cannot supply the electric vehicle 4 with the energy amount required for passing through the failed road segment, the required energy amount can be supplied using the different vehicle 70.

Further, in the present embodiment, when (i) the required energy amount cannot be supplied from the different vehicle 70 to the electric vehicle 4 scheduled to pass through the failed road segment, and (ii) the required energy amount cannot be supplied from the power supply apparatuses 20 on the traveling road 2 side, the electric vehicle 4 is driven at a low speed.

As a result, the time for supplying power to the electric vehicle 4 from the power supply apparatuses 20 on the traveling road 2 side (i.e., the time for charging the battery 44) becomes longer, and the required energy amount can be secured.

Therefore, according to the present embodiment, it is not necessary to change the traveling route of the electric vehicle 4 so as to bypass the failed road segment, as in the first embodiment and the second embodiment. Therefore, the usability of the electric vehicle 4 can be improved.

When the electric vehicle 4 is driven at a low speed, traffic congestion may occur. However, when all vehicles traveling on the traveling road 2 are automated-driving vehicles, traffic congestion can be reduced. Therefore, if the present disclosure is applied to such a system, more effects can be exhibited.

Other Embodiments (Modifications)

Although the embodiments of the present disclosure have been described above, the present disclosure is not limited to the embodiments described above, and various modifications can be made to implement the present disclosure.

Modification 1

In each of the above-described embodiments, when calculating the required energy amount based on the failed road segment information in S230, the charging controller 56 uses above-described Expression (1) to calculate the consumption energy [kWh] due to the running resistance generated during traveling in the failed road segment.

However, in more detail, the consumption energy [kWh] when the electric vehicle 4 travels in the failed road segment changes depending on the gradient of the traveling road 2 in the failed road segment or the traffic congestion on the traveling road 2 when the electric vehicle 4 travels in the failed road segment.

The error of the energy consumption [kWh] due to this change can be ignored by multiplying by a predetermined loss correction coefficient. However, in S230, the energy consumption [kWh] may be calculated in consideration of a change in each parameter such as a gradient of the failed road segment and/or traffic congestion in the failed road segment.

Calculation Method of Energy Consumption in Consideration of Gradient of Failed Road Segment In S230, gradient information indicating the gradient θ of the failed road segment with respect to the traveling direction of the host vehicle is acquired from the map information of the navigation apparatus 48, and the energy consumed by the gradient resistance is calculated by following Expression (2).

Energy consumption due to gradient[kWh]=Σ(vehicle weight[kg]×gravity acceleration×sin θ×estimated vehicle speed[km/h]/3.6)/1000 (2)

Then, the energy consumption [kWh] due to the gradient and the energy consumption [kWh] due to the running resistance calculated using above Expression (1) are added to obtain an addition result. The required energy amount [kWh] in consideration of the gradient is calculated by multiplying the addition result by a predetermined loss correction coefficient.

Calculation Method of Energy Consumption Considering Traffic Congestion in Failed Road Segment In S230, the traffic congestion prediction information of the failed road segment is obtained from the navigation apparatus 48 or the like. The distances of the congested road segment A where congestion occurs within the failed road segment and the normal road segment B where congestion does not occur within the failed road segment are determined. At the same time, the estimated vehicle speed in each road segment A, B is obtained.

Then, using these parameters, the energy consumption [kWh] is calculated for each of the road segments A and B using above Expression (1). In addition, the required energy amount [kWh] in consideration of the traffic congestion prediction information is calculated by adding the calculation results of the energy consumption for each of the road segments A and B and multiplying the addition result by a predetermined loss correction coefficient.

As described above, the required energy amount [kWh] is calculated in consideration of the gradient or the traffic congestion in the failed road segment. The required energy amount [kWh] required for the electric vehicle 4 to travel in the failed road segment can thus be obtained more accurately.

For this reason, according to the present modification, it is possible to more favorably prevent the electric vehicle 4 from becoming unable to travel in the failed road segment and stopping. In the above description, the method of calculating the required energy amount [kWh] in consideration of the gradient and the traffic congestion of the failed road segment has been described. The energy consumption may however be calculated by adding the energy consumption due to the gradient to the energy consumption calculated in consideration of the traffic congestion.

In this way, by multiplying the addition result by a predetermined loss correction coefficient, the required energy amount [kWh] required for traveling in the failed road segment can be more accurately obtained.

Modification 2

In the third embodiment, when the required energy amount cannot be secured on the traveling road up to the failed road segment, the electric vehicle 4 is decelerated to run at low speed to secure the required energy amount.

However, for example, the traveling road 2 may be provided with a plurality of traveling lanes in which the power supplied from the power supply apparatus 20 is different. In such a case, the required energy amount may be secured by changing the traveling lane to a traveling lane having a large power supply. Further, the required energy amount may be secured by combining the change of the traveling lane and the deceleration of the electric vehicle 4.

Modification 3

In the first to third embodiments, the power supplied from the power supply apparatus 20 is changed, the charging rate of the battery 44 is changed, or power is supplied from a different vehicle 70. Thus, it has been described that the required energy amount is secured before the electric vehicle 4 reaches the failed road segment.

However, when there is a failed road segment in the traveling road 2, it is sufficient that the required energy amount can be secured before the electric vehicle 4 reaches the failed road segment. Since there is no need to limit the power supply method for that purpose, the required energy amount may be ensured by combining the power supply methods of the first to third embodiments.

That is, at the same time as changing the power supplied from the power supply apparatuses 20, the charging rate of the battery 44 may be changed. By doing so, the required energy amount may be secured. In addition, electric power may be also supplied to the electric vehicle 4 from a different vehicle 70.

Modification 4

In the above-described embodiment, the electric vehicle 4 is described as being provided with the motor 42 as a power source and running only by rotation of the motor 42. However, the electric vehicle according to the present disclosure may be a hybrid vehicle equipped with an engine separately from the motor 42 instead of such an electric vehicle.

In addition, multiple functions of one component in the above embodiment may be realized by multiple components, or a function of one component may be realized by multiple components. In addition, multiple functions of multiple components may be realized by one component, or a single function realized by multiple components may be realized by one component. In addition, a part of the configuration of the above embodiment may be omitted. At least a part of the configuration of the above embodiment may be added to or substituted for the configuration of the other above embodiment.

Furthermore, it is noted that the controllers and methods described in the present disclosure (i.e., an individual one of the facility controller 30, the charging controller 56, the power supply controller 26, the vehicle controller 46, or the functions, the units, or modules provided by an individual one of the controllers in the above embodiments) may be implemented by one or more special-purpose computers.

Such computers may be created (i) by configuring a memory and a processor programmed to execute one or more particular functions embodied in computer programs, or (ii) by configuring a processor provided by one or more special purpose hardware logic circuits, or (iii) by configuring a combination of (a) a memory and a processor programmed to execute one or more particular functions embodied in computer programs and (b) a processor provided by one or more hardware logic circuits.

The computer programs may be stored, as instructions being executed by a computer, in a tangible non-transitory computer-readable storage medium.

For reference to further explain features of the present disclosure, the description is added as follows.

An on-travel power supply system is a system in which power supply apparatuses are provided to be arranged along a traveling road, thereby enabling the power supply apparatuses to supply power to an electric vehicle that is traveling on the traveling road.

In the above-mentioned on-travel power supply system, the power can be supplied while the electric vehicle is traveling. This can suppress a situation in which the battery mounted on the electric vehicle is discharged before the electric vehicle reaches a destination to thereby prevent the electric vehicle from traveling up to the destination.

A detailed study by the inventor has found an issue as follows. That is, some of the power supply apparatuses along the traveling road may fail. In such a case, an electric vehicle cannot be supplied with the power in the corresponding failed road segment; the electric vehicle may be caused to stop traveling.

It is thus desired to provide an on-travel power supply system in which even if a part of power supply apparatuses along a traveling road may fail, an electric vehicle is enabled to travel on the traveling road including the corresponding failed road segment.

An aspect of the present disclosure described herein is set forth in the following clauses. According to an aspect of the present disclosure, an on-travel power supply system may be provided to include (i) a power supply facility including a plurality of power supply apparatuses arranged along a traveling road, and (ii) an electric vehicle including a power reception apparatus configured to receive power supply from the plurality of power supply apparatuses and charge a battery while traveling on the traveling road.

The power supply facility may further include (i) a failed road segment detection unit configured to detect a failed road segment in which the power supply is disabled from the power supply apparatuses in the traveling road, and (ii) a failed road segment notification unit configured to notify the electric vehicle of the detected failed road segment.

The electric vehicle may further include (i) a failed road segment acquisition unit configured to acquire the failed road segment notified of from the power supply facility, (ii) a required energy calculation unit configured to calculate a required energy amount required for the electric vehicle to pass through the failed road segment, and (iii) a required energy securing unit configured to secure the calculated required energy amount before the electric vehicle reaches the failed road segment.

The above configuration can provide the following. That is, a part of the power supply apparatuses along the traveling road may fail so that an electric vehicle cannot be supplied with the power in the corresponding failed road segment. Even in such a case, the electric vehicle can detect the failed road segment, and secure the energy before reaching the failed road segment; the secured energy is required to pass through the failed road segment.

Therefore, the on-travel power supply system of the present disclosure can suppress the inability of the electric vehicle to travel due to insufficient power in the failed road segment. As a result, the traveling performance of the electric vehicle can be improved.

What is claimed is:

1. An on-travel power supply system comprising:
a power supply facility including a plurality of power supply apparatuses arranged along a traveling road; and
an electric vehicle including a power reception apparatus configured to receive power supply from the plurality of power supply apparatuses and charge a battery while traveling on the traveling road,
the power supply facility comprising:
a failed road segment detection unit configured to detect a failed road segment in which the power supply is disabled from the power supply apparatuses in the traveling road; and
a failed road segment notification unit configured to notify the electric vehicle of the detected failed road segment,
the electric vehicle comprising:
a failed road segment acquisition unit configured to acquire the failed road segment notified of from the power supply facility;
a required energy calculation unit configured to calculate a required energy amount required for the electric vehicle to pass through the failed road segment; and
a required energy securing unit configured to secure the calculated required energy amount before the electric vehicle reaches the failed road segment.

2. The on-travel power supply system according to claim 1,
wherein the power supply facility comprises a first controller connecting with the plurality of power supply apparatuses via a communication link, the first controller serving as the failed road segment detection unit and the failed road segment notification unit,
wherein the electric vehicle comprises a second controller connecting with the power reception apparatus via a communication line and communicating with the first controller in the power supply facility with a wireless communication line, the second controller serving as the failed road segment acquisition unit, the required energy calculation unit, and the required energy securing unit.

3. The on-travel power supply system according to claim 1,
wherein in the electric vehicle, the required energy securing unit is further configured
to calculate a required power to charge the battery based on the calculated required energy amount, a distance to the failed road segment, and a vehicle speed, and
to request the calculated required power from the power supply facility, wherein the power supply facility includes
(i) a required power acquisition unit configured to acquire the required power requested by the electric vehicle, and
(ii) a power supply control unit configured to control power supply from each of the power supply apparatuses to the electric vehicle according to the acquired required power.

4. The on-travel power supply system according to claim 3,
wherein the power supply facility comprises a first controller connecting with the plurality of power supply apparatuses via a communication line, the first controller serving as the failed road segment detection unit, the failed road segment notification unit, the required power acquisition unit, and the power supply control unit,
wherein the electric vehicle comprises a second controller connecting with the power reception apparatus via a communication line and communicating with the first controller in the power supply facility with a wireless communication line, the second controller serving as the failed road segment acquisition unit, the required energy calculation unit, and the required energy securing unit.

5. The on-travel power supply system according to claim 1,
wherein in the electric vehicle, the required energy securing unit is further configured
to calculate a required power to charge the battery based on the calculated required energy amount, a distance to the failed road segment, and a vehicle speed, and
to control a charging rate when the power reception apparatus charges the battery based on the calculated required power.

6. The on-travel power supply system according to claim 1,
wherein the electric vehicle includes an inter-vehicle power reception apparatus configured to receive power supply from a different vehicle traveling around the electric vehicle,
wherein in response to the power supply being enabled to be received from the different vehicle via the inter-vehicle power reception apparatus, the battery is charged by receiving the power supply from the different vehicle via the inter-vehicle power reception apparatus.

7. A power supply facility comprising:
a plurality of power supply apparatuses arranged along a traveling road and configured to perform power supply to an electric vehicle traveling on the traveling road;
a failed road segment detection unit configured to detect in the traveling road a failed road segment in which the power supply is disabled from the power supply apparatuses; and
a failed road segment notification unit configured to notify the electric vehicle of the detected failed road segment.

8. The power supply facility according to claim 7, further comprising:
a controller connecting with the plurality of power supply apparatuses via a communication line and communicating with the electric vehicle via a wireless communication line, the controller serving as the failed road segment detection unit and failed road segment notification unit.

9. An electric vehicle comprising:
a power reception apparatus configured to receive power supply from a plurality of power supply apparatuses arranged along a traveling road and charge a battery while traveling on the traveling road;
a failed road segment acquisition unit configured to acquire a failed road segment from a power supply facility including the plurality of power supply apparatuses, the failed road segment in which the power supply is disabled from the power supply apparatuses;
a required energy calculation unit configured to calculate a required energy amount required for the electric vehicle to pass through the failed road segment; and
a required energy securing unit configured to secure the calculated required energy amount before the electric vehicle reaches the failed road segment.

10. The electric vehicle according to claim 9,
wherein the electric vehicle comprises a controller connecting with the power reception apparatus via a communication line and communicating with the power supply facility with a wireless communication line, the controller serving as the failed road segment acquisition unit, the required energy calculation unit, and the required energy securing unit.

11. The electric vehicle according to claim 9,
wherein the required energy securing unit is further configured
to calculate a required power to charge the battery based on the calculated required energy amount, a distance to the failed road segment, and a vehicle speed, and
to request the calculated required power from the power supply facility.

12. The electric vehicle according to claim 9,
wherein the required energy securing unit is further configured
to calculate a required power to charge the battery based on the calculated required energy amount, a distance to the failed road segment, and a vehicle speed, and
to control a charging rate when the power reception apparatus charges the battery based on the calculated required power.

13. The electric vehicle according to claim 9, further comprising:
an inter-vehicle power reception apparatus configured to receive power supply from a different vehicle traveling around the electric vehicle,
wherein in response to the power supply being enabled to receive from the different vehicle via the inter-vehicle power reception apparatus, the battery is charged by receiving the power supply from the different vehicle via the inter-vehicle power reception apparatus.

14. The electric vehicle according to claim 9,
wherein the required energy calculation unit is configured
to acquire gradient information of the traveling road in the failed road segment, and
to calculate the required energy amount using the acquired gradient information as one parameter.

15. The electric vehicle according to claim 9,
wherein the required energy calculation unit is configured
to acquire congestion prediction information in the failed road segment, and
to calculate the required energy amount using the acquired congestion prediction information as one parameter.

16. The electric vehicle according to claim 9,
wherein the required energy securing unit is configured to determine whether the required energy amount is secured before the electric vehicle reaches the failed road segment,
wherein when it is determined that the required energy amount is disabled to be secured, a request to change a scheduled traveling route is issued to prevent the electric vehicle from traveling in the failed road segment.

17. The electric vehicle according to claim 9,
wherein the required energy securing unit is configured to determine whether the required energy amount is enabled to be secured before the electric vehicle reaches the failed road segment,
wherein when it is determined that the required energy amount is disabled to be secured, a vehicle speed of the electric vehicle is reduced.

\* \* \* \* \*